United States Patent
Vasey

(10) Patent No.: US 7,757,160 B2
(45) Date of Patent: Jul. 13, 2010

(54) DEBUGGING OF MASTER DOCUMENTS

(75) Inventor: Philip E. Vasey, Histon (GB)

(73) Assignee: Business Integrity Limited (GB)

( * ) Notice: Subject to any disclaimer, the term of this patent is extended or adjusted under 35 U.S.C. 154(b) by 835 days.

(21) Appl. No.: 11/668,702

(22) Filed: Jan. 30, 2007

(65) Prior Publication Data

US 2007/0192760 A1 Aug. 16, 2007

Related U.S. Application Data

(60) Provisional application No. 60/763,223, filed on Jan. 30, 2006.

(51) Int. Cl.
*G06F 17/00* (2006.01)
(52) U.S. Cl. ........................ 715/221; 715/222; 717/124; 717/131
(58) Field of Classification Search .................. 715/221, 715/22, 267; 717/124, 131
See application file for complete search history.

(56) References Cited

U.S. PATENT DOCUMENTS

| | | | |
|---|---|---|---|
| 6,182,095 B1 * | 1/2001 | Leymaster et al. .......... | 715/236 |
| 7,296,017 B2 * | 11/2007 | Larcheveque et al. .......... | 707/6 |
| 2002/0198935 A1 * | 12/2002 | Crandall et al. ............. | 709/203 |
| 2003/0078906 A1 | 4/2003 | Ten-Hove et al. | |
| 2003/0140053 A1 * | 7/2003 | Vasey ......................... | 707/100 |
| 2004/0060005 A1 * | 3/2004 | Vasey ......................... | 715/513 |
| 2004/0117769 A1 | 6/2004 | Lauzon | |
| 2005/0028084 A1 * | 2/2005 | Dziejma ..................... | 715/505 |
| 2006/0190816 A1 * | 8/2006 | Vasey ......................... | 715/519 |
| 2006/0248097 A1 * | 11/2006 | Pritchard et al. ............ | 707/100 |

FOREIGN PATENT DOCUMENTS

| | | |
|---|---|---|
| EP | 1146436 A2 | 10/2001 |
| WO | WO 0104772 A2 * | 1/2001 |

OTHER PUBLICATIONS

GB0701755.1 Search Report.

* cited by examiner

*Primary Examiner*—Adam M Queler
(74) *Attorney, Agent, or Firm*—Anderson Gorecki & Manaras LLP

(57) ABSTRACT

The present invention relates to debugging of document templates or master documents used in the automated generation of customised documents.

8 Claims, 2 Drawing Sheets

DEBUGGING OF MASTER DOCUMENTS

CROSS-REFERENCE TO RELATED APPLICATIONS

A claim of priority is made to U.S. Provisional Patent Application 60/763,223, titled Debugging of Master Documents, filed Jan. 30, 2006, which is incorporated by reference.

FIELD OF THE INVENTION

The present invention relates to debugging of document templates or master documents used in the automated generation of customised documents.

BACKGROUND OF THE INVENTION

It is known to create customised documents using document templates or master documents. In our system, customised documents are generated using master documents which contain portions of document content, such as text or images, which are selectively incorporated into the resulting customised documents. For example, portions of document content included in the master document may be included in the final customised document only if certain conditions are satisfied. Such portions of document content may be referred to as conditional document content. The master document may also include portions of document content which are included unconditionally in the final customised document.

In one example, a social services document customised to a particular person who is the subject of the document may be generated from a master document. If the subject is pregnant then the final document may need to include a portion of text relating to the pregnancy. In this case the master document contains a specific text portion relating to pregnancy which is only included in the final customised document if it has been determined that the subject is actually pregnant. The final document may also need to include a standard clause which is included regardless of pregnancy but whose wording differs depending on whether the subject is male or female. In this case, the master document contains two text portions corresponding to the alternative clause wordings. One or the other of the two text portions is selectively included in the customised document depending on whether the subject is male or female.

The information required to generate a customised document may be represented by one or more variables. In the examples given above, a first variable 'Pregnant' which can take one of the two values 'True' or 'False' is used to represent whether the subject is pregnant or not. A second variable 'Gender' which can take one of the two values 'Male' or 'Female' is used to represent the gender of the subject. In our system, the variables may also take values indicating that the value of a variable is unknown or indefinite.

The variables associated with a master document may be used to form logical statements which may in turn be used to specify the conditions which need to be satisfied for each portion of document content to be included in the customised document. For example, the logical statement Gender IS 'Female' may be formed which evaluates to True if the subject is female and evaluates to False if the subject is male. This logical statement represents the condition which must be satisfied (i.e. evaluate to True) for the standard clause relating to female subjects to be included in the customised document. The simplest logical statement is a variable such as 'Pregnant', which can take the values True and False, appearing on its own. In this case the evaluation of the logical statement is simply the value of the variable. Such a variable, 'Variable', appearing on its own as a logical statement may be considered to be shorthand for Variable IS 'True'. More complicated logical statements may also be formed by combining simpler statements using the logical operators AND, OR and NOT. For example, the logical statement (Gender IS 'Female') AND NOT(Pregnant) may be formed which evaluates to True only if the subject is female and not pregnant. The conditions (in the form of logical statements) which dictate whether particular portions of document content are included in the customised document may be referred to as usage statements.

The way in which portions of document content are incorporated into customised documents may be represented in the form of a mark-up of the master document. For example, a portion of conditional text in the master document may be indicated as such by enclosing the text in square bracket, [ . . . conditional text . . . ]. The usage statement associated with a particular portion of document content is indicated as superscript on the inside of the left-hand bracket associated with the portion of document content, $[^{Usage\ Statement}$ . . . conditional text . . . ]. The conditional document content is included in the customised document only if the usage statement associated with that conditional document content evaluates to true. For example, the mark-up $[^{Gender\ IS\ `Male`}$ Text portion 1 . . . ] indicates that the text 'Text portion 1 . . . ' is included in the customised document only if the subject is male. Similarly, the mark-up $[^{Pregnant}$ Text portion 2 . . . ] indicates that the text 'Text portion 2 . . . ' is included in the customised document only if the subject is pregnant. In the example given above where alternative clause wordings are used depending on whether the subject is male or female, the master document contains $[^{Gender\ IS\ `Male`}$ Clause wording 1 . . . ] $[^{Gender\ IS\ `Female`}$ Clause wording 2 . . . ]. The position of the document content in the customised document depends on the position of the document content within the master document.

Variables such as 'Name' or 'Address' may also appear in the text portions. When a variable appears within a portion of text, the variable may be distinguished from the rest of the text by being shown between curly brackets, {variable}. One example of a conditional text portion illustrating this is $[^{Pregnant}$ The mother is {Name} who lives at {Address} . . . ].

Although the examples given above represents one form of mark-up, other forms of mark-up may also be used. Our U.S. patent application Ser. No. 10/434,753, incorporated herein by reference, discloses two different forms of mark-up notation and a system and method for converting a master document written in one mark-up notation to a master document written in a different mark-up notation. More complex mark-up notation may also be used. For example, our International patent applications, publication numbers WO 2005/024653, WO 2005/024654, WO 2005/024656 and WO 2005/024660, incorporated herein by reference, disclose several examples.

In order to generate a fully customised document it is necessary to determine the values of all the relevant variables so that the usage statements can be evaluated which in turn allows a determination to be made as to which of the portions of conditional document content to include in the final customised document. This information may be collected by means of a questionnaire which a user completes to assign values to the variables. In the examples given above, a user may be asked a first question enquiring as to the gender of the subject. A second question may then be asked enquiring as to whether the subject is pregnant. The questionnaire may be presented to the user in the form of a series of web pages for example in which the user types answers into text boxes or checks tick boxes corresponding to predefined alternative answers. The questionnaire may be generated automatically by analysing the master document and determining from the mark-up and the variables present which questions to ask. Our International patent applications, publication numbers WO 01/04772 and WO 03/061474, incorporated herein by reference, disclose systems and methods for generating a questionnaire from a master document.

In many cases, some variables may be relevant or not depending on the value of other variables. For example, if the subject is male then the variable 'Pregnant' is not relevant since in this case the subject can never be pregnant. A first variable may be said to be dependent on one or more further variable if an associated condition (in the form of a logical statement) involving the further variables must be satisfied (i.e. evaluate to true) for the first variable to be relevant. The first variable may be referred to as the dependent variable and the further variables may be referred to as the controlling variables. The associated condition which must be satisfied may be referred to as the conditional of the dependency. A conditional is usually in the form of an expression which specifies the values that should be assigned to each of the controlling variables. For example, the variable Pregnant is dependent on the controlling variable Gender because the conditional Gender IS 'Female' must evaluate to true for the variable Pregnant to be relevant.

If the values of one or more of the controlling variables of a dependent variable are unknown then the dependent variable may be regarded as being relevant. For example, if the gender of the subject is unknown then the variable 'Pregnant' is relevant. Conversely, a dependent variable is not relevant if, and only if, the conditional of the dependency can be definitely proven to be false. In short, a variable is not relevant if it can be determined that it is not required. In all other situations, it is necessary to assume that the variable may be needed, even if eventually, once all controlling variables are known, it turns out that the variable is not required.

The dependency between variables may be represented by a dependency network as disclosed in our provisional U.S. patent application Ser. No. 60/710,727, incorporated herein by reference.

The questionnaire may take variable dependencies into account by only asking those questions which are relevant. For example, if a user has indicated in a previous question that the subject is male then the question regarding pregnancy may be hidden from the user, greyed out or otherwise disabled so that the user cannot provide an answer. Since the relevance of dependent variables depends on the value of one or more controlling variables, when a question relating to a controlling variable is answered, a variable that depends on that controlling variable that was previously relevant may become irrelevant. Each time a question is answered, the questionnaire is arranged to dynamically update the enabling and disabling of questions based on the new information. For this reason, the questionnaire may be referred to as a dynamic questionnaire.

It is important that the behaviour of the questionnaire is proper in the sense that questions relating to irrelevant variables are disabled and questions relating to relevant variables are enabled. This behaviour is desirable to ensure that all relevant information is collected while avoiding collecting irrelevant information. Our earlier International patent application publication number WO 2005/024655, incorporated herein by reference, discloses a system and method for determining the relevance of variables by analysing the structure of a master document. A master document may contain several occurrences of a variable 'V' for example as part of usage statements or within portions of conditional text. The overall relevance of the variable 'V' is determined by considering the relevance of each individual occurrence of the variable in the master document. Then, if any of the occurrences of the variable are relevant then the variable is relevant overall. This is explained in greater detail below.

The overall relevance of a variable 'V' may be denoted by relevant(V) which evaluates to true if 'V' is relevant overall and evaluates to false if 'V' is not relevant overall. A variable is considered to be relevant overall if its value needs to be known to generate a customised document from the master document, considering all occurrences of the variable. The relevance of the kth occurrence of 'V' may be denoted by dependency(V)$_k$. A particular occurrence of a variable is considered to be relevant if its value would need to be known to generate a customised document from the master document if that occurrence were the only one. Dependency(V)$_k$ consists of a logical expression, which may be referred to as a dependency statement, which is defined so that it evaluates to true if the kth occurrence of 'V' is relevant and evaluates to false if the kth occurrence of 'V' is not relevant. Where there are K occurrences of 'V', the relationship between relevant(V) and dependency(V)$_k$ is given by $$\text{relevant(V)=dependency(V)}_1 \text{ OR dependency(V)}_2 \text{ OR } \ldots \text{ dependency(V)}_K$$

This ensures that if any one occurrence of V in the master document is relevant, in which case one of the dependency statements dependency(V)$_k$ will evaluate to true, then relevant(V) will evaluate to true meaning that V is relevant overall.

A number of examples of dependency statements will now be given involving the variable 'Variable'. If the master document contains the conditional text [$^{Usage\ Statement}$ ... {Variable} ... ] then, considering this occurrence of the variable only, the variable is relevant only if the usage statement evaluates to true. This is because if the usage statement evaluates to false then the conditional text, along with this occurrence of the variable, would not be included in the customised document. If, however, the usage statement evaluates to true then the variable would appear in the customised document and it would be necessary therefore to determine the value of the variable. In this case, since the variable is relevant when the usage statement evaluates to true and not relevant when the usage statement evaluates to false, the dependency statement is the usage statement itself so that dependency(Variable)$_k$=Usage Statement.

In the case where the variable is nested within two or more conditional portions of text such as [$^{Usage\ Statement\ 1}$ ... [$^{Usage\ Statement\ 2}$ ... [$^{Usage\ Statement\ N}$ ... {Variable} ... ]]] then the dependency statement for this particular occurrence of 'Variable' is dependency(Variable)$_k$=Usage Statement 1 AND Usage Statement 2 AND ... Usage Statement N. This is because the inner most conditional text portion containing the variable will be included in the customised document only if each of the surrounding text portion are also included. Hence, this particular occurrence of 'Variable' will be relevant only if all of the usage statements evaluate to true.

If a variable occurs within a usage statement then the relevance of that particular occurrence of the variable depends on the other variables within the usage statement. For example, if the master document contains the passage [$^{Variable\ OR\ Variable\ 2}$ ... conditional text ... ], then 'Variable' is only relevant if 'Variable 2' is false. This is because if 'Variable 2' is true then the usage statement Variable OR Variable 2 evaluates to true regardless of the value of 'Variable'. Therefore, if 'Variable 2' is true then the value of 'Variable' does not need to be known to evaluate the usage statement to determine whether the conditional text should be included in the customised document. In this case, this occurrence of 'Variable' is not relevant. If, however, the value of 'Variable 2' is false then the value of 'Variable' does need to be known to evaluate the usage statement. In this case, therefore, this occurrence of 'Variable' is relevant. It can be seen that the relevance of this particular occurrence of the variable is dependency(Variable)$_k$=NOT(Variable 2).

In another similar example, if the master document contains the passage [$^{Variable\ AND\ Variable\ 2}$ . . . conditional text . . . ], then 'Variable' is only relevant if 'Variable 2' is true. This is because if 'Variable 2' is false then the usage statement Variable AND variable 2 evaluates to false regardless of the value of 'Variable'. Therefore, if 'Variable 2' is false then the value of 'Variable' does not need to be determined to evaluate the usage statement. In this case this occurrence of 'Variable' is not relevant. If, however, the value of 'Variable 2' is true then the value of 'Variable' does need to be determined to evaluate the usage statement. In this case, therefore, this occurrence of 'Variable' is relevant. It can be seen that the relevance of this particular occurrence of the variable is dependency (Variable)$_k$=Variable 2.

In a third, and more complicated example, if the master document contains the passage [$^{((Variable\ AND\ Variable\ 2)\ OR\ (Variable\ AND\ Variable\ 3))\ OR\ Variable\ 4}$ . . . conditional text . . . ], it can be seen that the relevance of this occurrence of 'Variable' is given by dependency(Variable)$_k$=(Variable 2 OR Variable 3) AND NOT(Variable 4). In general, for an occurrence of a first variable within a usage statement, the dependency statement is the logical statement involving other variables which evaluates to false if the value of the first variable does not need to be known to evaluate the usage statement and evaluates to true otherwise.

Once the dependency statements for each occurrence of a variable in the master document have been determined, the overall relevance of the variable can be determined by evaluating the statement relevant(V) as explained above. The questionnaire is then arranged to disable any questions relating to variables for which relevant(V) evaluates to false and to enable any questions relating to variables for which relevant (V) evaluates to true.

In an error free master document, the master document structure conforms with the dependency relationships between variables defined by the conditionals. In other words, the result in determining whether a variable is relevant or not should be the same using the expression relevant(V) and the conditionals.

One problem which the method described above is that errors may occur in the structure of the master document resulting in errors in customised documents generated using the master document. In master documents which are lengthy or which have complex structures, it may be difficult to spot such errors. We have appreciated the need for a system and method to allow accurate and efficient debugging of master documents.

DESCRIPTION OF PREFERRED EMBODIMENTS

Figure 1:
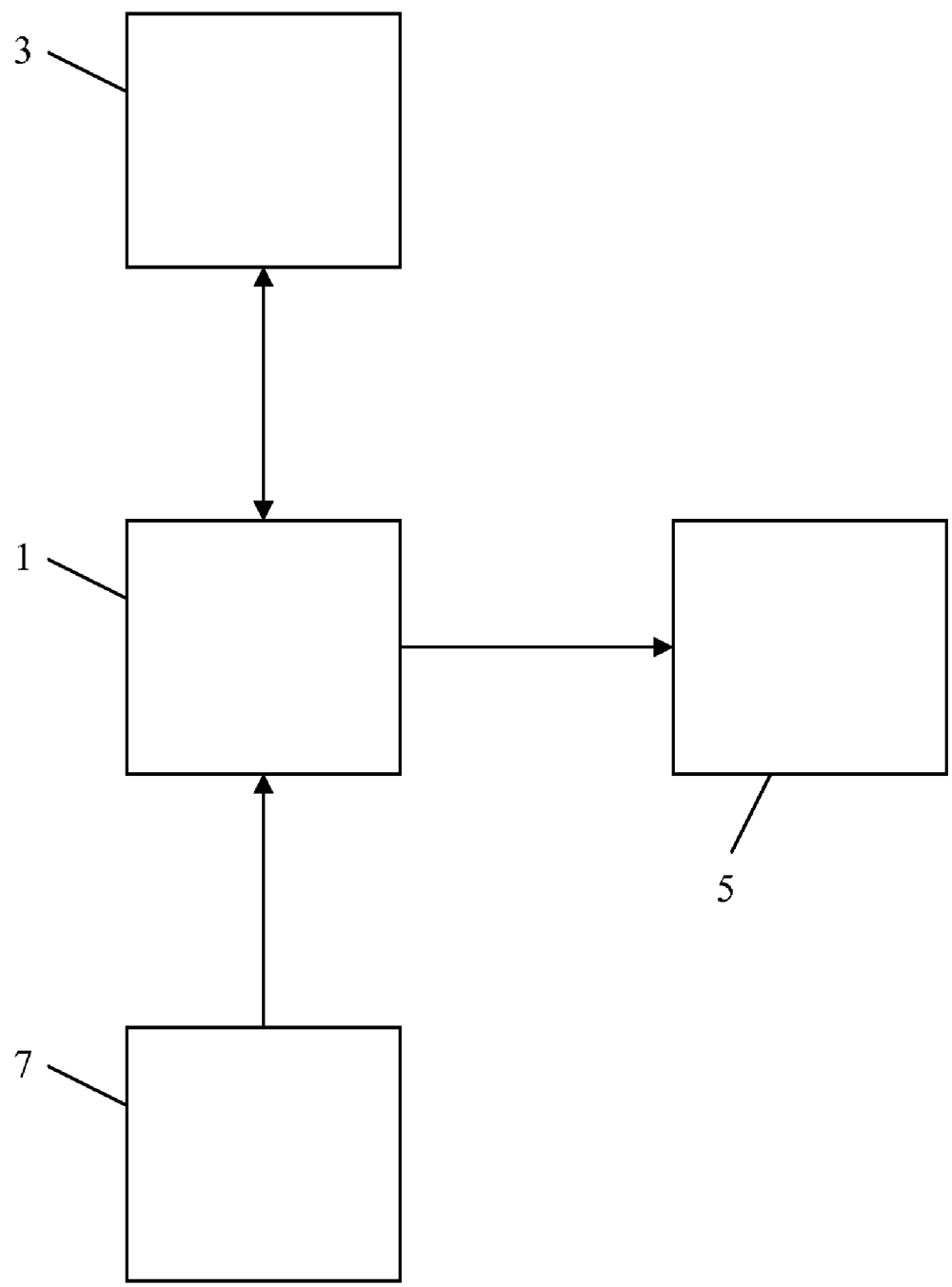
FIG. 1 is a schematic diagram of a system in which the invention may be employed.
Figure 2:
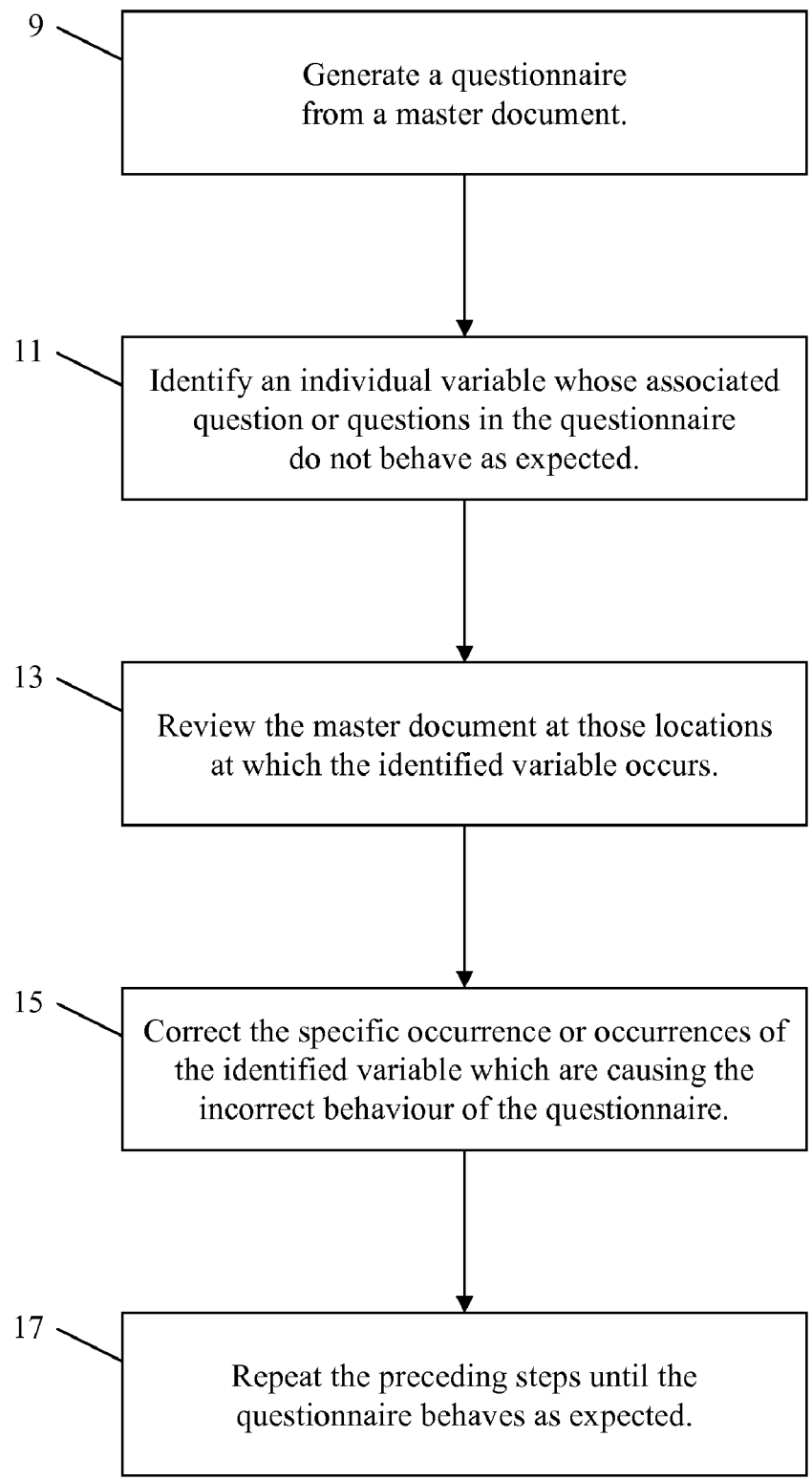
FIG. 2 is a flow chart of a method according to the invention.

In the method described above, the behaviour of the questionnaire (i.e. the disabling and enabling of questions) depends upon the evaluation of the expressions relevant(V) for each variable. Since the form of the expressions relevant (V) depend on an analysis of the master document, the behaviour of the questionnaire depends on the structure of the master document. Therefore, if the questionnaire behaves in an unexpected way which is contrary to the conditionals, for example if certain questions are disabled when they should be enabled or certain questions remain enabled when they should be disabled, then this can be attributed to an error in the structure of the master document. An error in the structure of the master document may arise in particular because the structure does not conform with the true dependency relationships between variables defined by the conditionals. We have appreciated that unexpected behaviour of the questionnaire provides an indication of structural errors in the master document.

Furthermore, we have appreciated that unexpected behaviour of a question relating to a particular variable provides an indication of a structural error in the master document at a place where that variable occurs. Since unexpected behaviour in a questionnaire is more easily identified than structural errors in the master document, and since the unexpected behaviour can be easily traced to a limited number of places in the master document, the present invention provides a more straightforward and efficient means to debug a master document than a simple examination of the master document. The terms debug, debugging and so on are conventionally used in the context of computer programming to mean the elimination of errors in computer programs. These terms are used herein in a broader sense and are not intended to be limited to the context of computer programs and software.

One exemplary method for debugging a master document comprises the following steps.

a) generate a questionnaire from the master document,
  b) identify an individual variable whose associated question or questions in the questionnaire do not behave as expected,
  c) review the master document at those locations at which the identified variable occurs,
  d) correct the specific occurrence or occurrences of the identified variable which are causing the incorrect behaviour of the questionnaire, and
  e) repeat steps a to d until the questionnaire behaves as expected.

The step 9 of generating a questionnaire from the master document may be performed using any suitable system and method, such as those described in our earlier international patent applications, publication numbers WO 01/04772 and WO 03/061474, incorporated herein by reference. This step may be automated.

The next step 11 of identifying an individual variable whose associated question or questions do not behave as expected may be performed for example as a visual exercise by a user. Unexpected behaviour of a question can be characterised by the following two types of behaviour.

A first type of unexpected behaviour is when a question unexpectedly remains enabled when it should be disabled. One example of the first type of unexpected behaviour is when a question concerning pregnancy remains enabled even when a user has indicated in the answer to a previous question that the gender of the subject of the document is male. When a question relating to a dependent variable (for example 'Pregnant') remains enabled even though the controlling variable or variables upon which it depends (for example 'Gender') have the correct values to disable it (for example Gender IS 'Male'), then the dependent variable may be said to have too weak a dependency on the controlling variables.

A second type of unexpected behaviour is when a question is unexpectedly disabled when it should be enabled. One example of the second type of unexpected behaviour is when the question regarding pregnancy is disabled even though the gender of the subject is female. When a question relating to a dependent variable (for example 'Pregnant') is unexpectedly disabled even though the controlling variable or variables upon which it depends (for example 'Gender') have the correct values to enable it (for example Gender IS 'Female'), then the dependent variable may be said to have too strong a dependency on the controlling variables.

Searching for unexpected behaviour in the questionnaire may be performed using a trial and error process. For example, a person attempting to debug the master document may try providing different combinations of answers for the questions and observing with each answer given whether the questionnaire is behaving properly. In the example described above, the user may answer the question concerning gender by specifying 'Male' and observing whether or not the question concerning pregnancy has been disabled or not. A similar process may be carried out for questions involving other variables.

In the next step 13, once it has been determined that a question in the questionnaire relating to a particular variable is behaving unexpectedly, the master document is reviewed to identify which occurrence of the identified variable in the master document is causing the unexpected behaviour. The occurrences of the identified variable in the master document may be reviewed one at a time in order of their occurrence in the master document, or in some other order.

In the next step 15, once the specific occurrences of the variable which is causing the unexpected behaviour of the questionnaire are identified in the master document, the errors can be corrected. This step may be carried out manually by a person having knowledge about the domain of the master document.

In the next step 17, the preceding steps are repeated until all errors in the master document have been corrected and the questionnaire behaves as expected.

In the method described above, if the master document is long or has a complex structure then it may be time consuming to review each occurrence of a particular variable in order to identify those occurrences which cause unexpected behaviour of the questionnaire. Preferably, the order in which the occurrences of the identified variable are reviewed is chosen so as to reduce the time required to identify the particular occurrences which are causing the unexpected behaviour of the questionnaire. The following method may be used to choose such an order.

Considering a variable $V^x$ which depends on one or more controlling variables $V^y$, a too weak a dependency occurs when relevant($V^x$) evaluates to true when it should evaluate to false. From the expression for relevant($V^x$) in terms of the expressions dependency($V^x$)$_k$ it can be seen that a too weak dependency occurs when one or more of the expressions dependency($V^x$)$_k$ evaluate to true when they should all evaluate to false. This in turn occurs when one or more of the dependency statements dependency($V^x$)$_k$ do not mention all of the controlling variables $V^y$ or do not equate the correct values to the controlling variables. This results from an error in the structure of the master document at one occurrence, at least, of the variable $V^x$.

For example, a too weak dependency occurs when the variable 'Pregnant' occurs unconditionally or otherwise outside the scope of the variable 'Gender' as in [$^{Pregnant}$ The applicant is entitled to free dental care.]. A too weak dependency also occurs for example when the variable 'Pregnant' occurs within a portion of conditional text which is associated with male subjects as in the following.

[$^{Gender\ IS\ 'Female'\ AND\ Pregnant}$ The applicant is entitled to 25 working days maternity leave prior to the expected birth of the child and 45 working days maternity leave immediately following the birth of the child.]

[$^{Gender\ IS\ 'Male'\ AND\ Pregnant}$ The applicant is entitled to 25 working days paternity leave immediately following the birth of the child.]

Considering again a variable $V^x$ which depends on one or more controlling variables $V^y$, a too strong a dependency occurs when relevant($V^x$) evaluates to false when it should evaluate to true. From the expression for relevant($V^x$) in terms of the expressions dependency($V^x$)$_k$ it can be seen that a too strong dependency occurs when all of the expressions dependency($V^x$)$_k$ evaluate to false when at least one should evaluate to true. This in turn occurs when all occurrences of dependency($V^x$)$_k$ equate the incorrect values to the controlling variables $V^y$. This results from an error in the structure of the master document at one occurrence, at least, of the variable $V^x$.

For example, a too strong dependency occurs when the variable 'Pregnant' only occurs within conditional text which is associated with male subjects and never occurs either unconditionally or within the scope of female subjects as in the following.

[$^{Gender\ IS\ 'Female'}$ The applicant is entitled to a state pension on the occasion of their 60th birthday.]

[$^{Gender\ IS\ 'Male'\ AND\ Pregnant}$ The applicant is entitled to a state pension on the occasion of their 65th birthday.

The applicant is entitled to 25 working days paternity leave immediately following the birth of the child.]

[$^{Gender\ IS\ 'Male'}$ [$^{Pregnant}$ The applicant's spouse is entitled to 25 working days maternity leave prior to the expected birth of the child and 45 working days maternity leave immediately following the birth of the child.]]

In order to minimise the number of occurrences of a variable which need to be reviewed to identify that occurrence which is causing the unexpected behaviour the dependency statements for each occurrence of the variable are ranked. In particular, a ranking of the dependency statements is a partial order defined such that the following condition is satisfied.

Dependency(V)$_i$ occurs before dependency(V)$_j$ if and only if:

(i) dependency(V)$_i$ is equivalent to dependency(V)$_j$ or
(ii) dependency(V)$_i$ is implied by dependency(V)$_j$ or
(iii) dependency(V)$_i$ does not imply dependency(V)$_j$ For example, the dependency statement Gender IS NOT 'Female' is implied by the dependency statement Gender IS 'Male' and so will occur before it in a partial order.

The condition 'does not imply' is the opposite of the term 'implied by'. That is, A does not imply B if, and only if, NOT(B is implied by A). For example, x is implied by (x AND y) but x does not imply (x AND y). An equivalence occurs when each of two statements implies the other. For example, A is equivalent to B if, and only if, A is implied by B and B is implied by A.

The ranking defined above is a partial order from the weakest dependency to the strongest dependency. To discover the dependency or dependencies which cause the unexpected behaviour on the questionnaire in the most efficient manner the occurrences of the variable in the master document are inspected as follows. If the question unexpectedly remains enabled the ranked dependencies are traversed from front (weakest) to back (strongest) because the likelihood is that the unexpected behaviour is caused by the weakest dependencies. If the question is unexpectedly disabled the ranked dependencies are traversed from back (strongest) to front (weakest), although all dependencies need to be considered as all are too strong.

The above method may be carried out by any suitable computer system comprising a processor 1, a memory 3, a display 5 such as a VDU, and one or more input devices 7 such as a keyboard and mouse. The memory 3 is arranged to store various data used in the system, and computer executable code which is executed by the processor 1 to perform various method steps and other processes. The display 5 is used to present the master document and the questionnaire to a user or debugger and the input devices 7 may be used to input information into the system.

A master document used in the system may be implemented for example in the form of a Microsoft Word document which contains various portions of document content such as text and in which the mark-up of the master document is represented by the formatting features of Microsoft Word such as superscript. When a person wishes to debug a master document, the master document is displayed on the display 5. The person debugging the master document may then edit or modify the master document via a user interface using one or more of the input devices 7.

The processor 1 is arranged to retrieve and analyse a selected master document and to automatically generate a questionnaire therefrom. The resulting questionnaire may be in the form of a web page created using HTML for example. The questionnaire may be completed by inputting various information in response to a series of questions presented on the display 5. The user may input information using the input devices 7 for example by typing text into text boxes, by selecting buttons corresponding to different options and so on. The user may also navigate forwards and backwards through the questionnaire amending their answers to the questions. In some embodiments, the questionnaire web page may be accessed independently from several computers connected together by a network. This allows different users to complete different parts of the questionnaire more easily. In some embodiments, the information required to answer some questions may be provided from an external database or other information source.

Although the invention has been described above in the context of generation of customised documents, the invention is not limited to this field. The present invention may be used for example to debug any document in which a means to collect information is generated using the document and the behaviour of the information collecting means depends on the structure, form or syntax etc. of the document.

Although some or all of the method steps described above may be performed manually, some or all of the steps may also be performed automatically, or semi-automatically, for example by being computerised. For example, in the step of identifying an individual variable whose associated question or questions in the questionnaire do not behave as expected, the system may be arranged to answer questions in a random or systematic order providing various different answers to each question in different combinations. Each time a question is answered, the system is arranged to analyse the behaviour of the questionnaire by comparing the actual behaviour with the behaviour that would be expected if it accorded with the conditionals. For this purpose, the system may be arranged to store a representation of the conditionals and a means to evaluate them. By evaluating the conditional for a dependent variable, the system can determine whether a question corresponding to that variable should be enabled or disabled. The system can then compare this to whether the question is actually enabled or disabled. The system then identifies which variable is associated with the question that is not behaving as expected by analysing the mapping between the questions and variables.

In the step of reviewing the master document at those locations at which the identified variable occurs, the system may be arranged to automatically search for all occurrences of the identified variable in the master document. If the ranking process described above is used, the system is arranged to determine the appropriate ranking before the search for occurrences of the variable is performed.

The system may be arranged to analyse each occurrence of the identified variable and analyse the structure of the master document at that point. Using stored information relating to the conditionals together with information defining the mark-up used in the master document, the system is arranged to identify possible errors in the master document. For example, the system may determine whether a dependent variable such as 'Pregnant' occurs unconditionally or otherwise outside the scope of its controlling variables, in this case 'Gender', in which case the system can determine whether a too weak dependency has occurred.

The system may be arranged to present possible errors to a user who can then confirm whether or not the system identified errors are actually errors. The system may also be arranged to automatically propose corrections to any identified errors which a user can either accept or reject.

The invention claimed is:

1. A method for debugging a master document of the type used to generate customised documents in a document generation system in which a dynamic questionnaire is generated according to the mark-up of the master document, wherein the markup comprises a plurality of conditional texts and a plurality of variables that control the inclusion of the conditional text the method comprising the steps performed by a computer system of:

identifying unexpected behaviour in a questionnaire generated from a master document, wherein the unexpected behaviour is a conditional text being disabled when the conditional text should be enabled, or a conditional text being enabled when the conditional text should be disabled;

identifying a variable corresponding to those questions in the questionnaire for which unexpected behaviour occurs; and defining a ranking of the dependencies of the identified variable (V) in the master document, the ranking being a partial ordering such that dependency $(V)_i$ occurs before dependency $(V)_j$ if and only if: dependency $(V)_i$ is equivalent to dependency $(V)_j$ or dependency $(V)_i$ is implied by dependency $(V)_j$ or dependency $(V)_i$ does not imply dependency $(V)_j$ where dependency $(V)_k$ is the dependency logic for the kth occurrence of the variable V in the master document;

inspecting the master document for errors at a plurality of locations at which the identified variable occurs by inspecting the locations at which the identified variable occurs in an order according to the ranking of the dependencies.

2. The method according to claim 1 in which the step of identifying unexpected behaviour in the questionnaire is performed automatically.

3. The method according to claim 1 in which the specific order is the order of the ranking of the dependencies from front to back if the unexpected behaviour in the questionnaire corresponds to a too weak dependency.

4. The method according to claim 1 in which the specific order is the order of the ranking of the dependencies from back to front if the unexpected behaviour in the questionnaire corresponds to a too strong dependency.

5. The method according to claim 1 comprising the preceding step of generating the dynamic questionnaire from the master document.

6. The method according to claim 1 comprising the further step of correcting any identified errors in the master document.

7. The method according claim 6 comprising the further step of repeating the preceding steps until all errors in the master document have been corrected.

8. An electronic document generation computer system in which a master document is used to generate customised documents and in which a dynamic questionnaire is generated according to the mark-up of the master document, wherein the markup comprises a plurality of conditional texts and a plurality of variables that control the inclusion of the conditional text, the system being arranged to enable debugging of the master document using the method comprising the steps of: identifying unexpected behaviour in the questionnaire generated from the master document, wherein the unexpected behaviour is a conditional text being disabled when the conditional text should be enabled, or a conditional text being enabled when the conditional text should be disabled; identifying a variable corresponding to those questions in the questionnaire for which unexpected behaviour occurs; defining a ranking of the dependencies of the identified variable (V) in the master document, the ranking being a partial ordering such that dependency $(V)_i$ occurs before dependency $(V)_j$ if and only if: dependency $(V)_i$ is equivalent to dependency $(V)_j$ or dependency $(V)_i$ is implied by dependency $(V)_j$ or dependency $(V)_i$ does not imply dependency $(V)_j$ where dependency $(V)_k$ is the dependency logic for the kth occurrence of th variable V in the master document; and inspecting the master document for errors at a plurality of locations at which the identified variable occurs by inspecting the locations at which the identified variable occurs in an order according to the ranking of the dependencies.

* * * * *